March 25, 1958  S. COLEMAN  2,827,973
BATTERY HOLD-DOWN FASTENING DEVICES
Filed Dec. 30, 1955
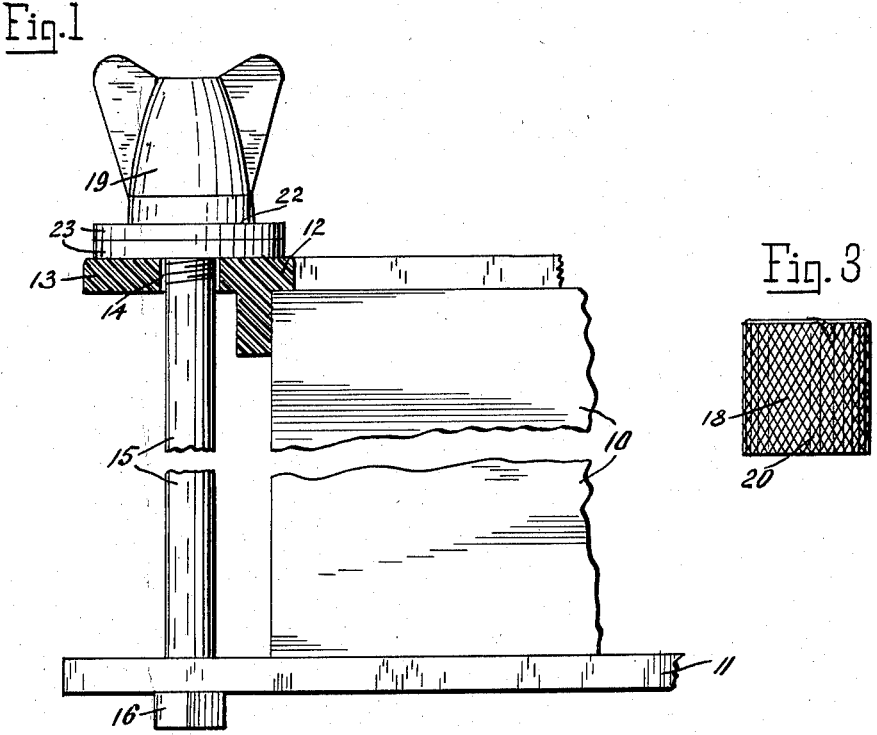
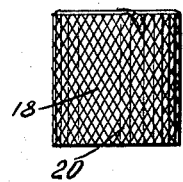
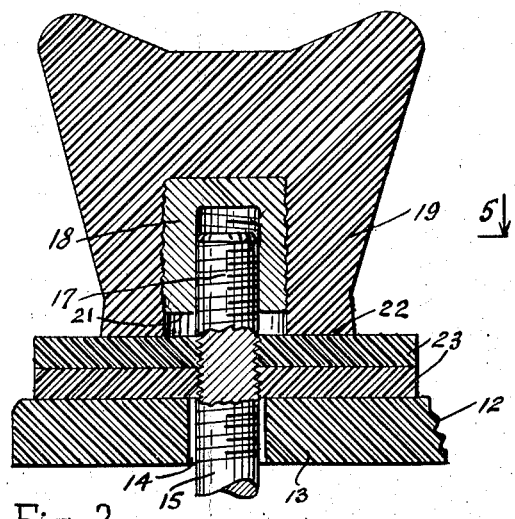
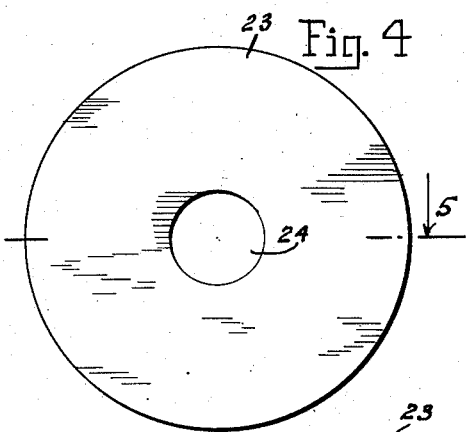
INVENTOR.
Sidney Coleman
BY Sigmund Hargoff
Attorney.

United States Patent Office 2,827,973
Patented Mar. 25, 1958

2,827,973

BATTERY HOLD-DOWN FASTENING DEVICES

Sidney Coleman, Maynard, Mass., assignor to Van Brode Milling Co., Inc., Clinton, Mass., a corporation of Massachusetts Application December 30, 1955, Serial No. 556,493

2 Claims. (Cl. 180—68.5)

The present invention relates to improvements in means associated with battery hold-down devices which bind the batteries, such as are used in automobiles, boats and the like, in position on their supports.

In U. S. Letters Patent No. 2,710,660, granted to my assignee on June 14, 1955, a hold-down frame of plastic material, such as a synthetic rubber resin, has been described. Some of the objects of the invention disclosed in said patent are to provide a hold-down frame which is adapted to resist the corrosive action of the battery electrolyte and which is of good electrical insulating properties so as to prevent short circuits if the battery cables are wet or have been injured by the electrolyte escaping from the battery. Since these frames are held in contact with the battery top by bolts and nuts, both metallic, the nuts bearing against the upper exposed faces of the frame and being in engagement with the upper ends of said bolts, it is obvious that said nuts and the upper ends of said bolts must be protected to prevent corrosion thereof by the battery electrolyte.

It has been proposed heretofore to provide caps for bolts and nuts to inhibit corrosion thereof, but the plan or scheme offered is not applicable to the battery hold-down frames above referred to in that the nuts are liable to loosen under vibration produced by jolting of the vehicle on the road.

The primary object of the present invention is to provide an acid-resistant cap for bolts and nuts which, by the use of acid resistant washers, is locked so that it will not be loosened by jarring or the like.

Another object of the invention is to obtain a device of the type referred to which is simple in construction, efficient in operation and which is capable of manufacture on a commercial scale or, in other words, one which is so simple to produce is not to be beyond the reasonable cost of such a contrivance.

With these and other objects in view, the invention may be said to comprise a metallic, internally threaded sleeve or ferrule for engagement with a screw-threaded bolt, said sleeve being fixed to a non-metallic, acid-resistant cap, the latter enclosing said sleeve, and a plurality of non-metallic, acid-resistant washers, one of which is, by the interlocking of said sleeve and said bolt, converted into a lock-nut, to prevent retrograde rotation of said sleeve.

One of the many possible embodiments of the invention is illustrated in the accompanying drawings, in which:

Figure 1 is a front elevation, partly in section, of a conventional battery, its support and hold-down frame, combined with a fastening device embodying the invention;

Figure 2 is a central, vertical section, on an enlarged scale, taken through the fastening;

Figure 3 is an elevation, drawn on the scale of Figure 2, of the sleeve or ferrule forming part of said fastening;

Figure 4 is a plan view, drawn on the scale of Figure 2, of one of the washers; and Figure 5 is a section taken on line 5—5 of Figure 4.

In the embodiment of the invention illustrated in the drawings, the numeral 10 indicates a battery of conventional construction, resting, when installed in a motor vehicle, upon a support 11. The battery is held on said support by the usual hold-down frame 12, having lugs 13 projecting from opposite sides thereof. Each of these lugs is provided with an aperture 14, through which a bolt 15 is extended. The lower headed end 16 of the bolt is fixed to the support 11, while its upper threaded end 17 projects above the lug 13 and is engaged by a metallic nut. This nut is usually of steel and is, in the present embodiment of the invention, in the form of an internally threaded thimble 18. The thimble is embedded in a plastic or other similar non-metallic cap 19, which is, preferably, in the shape of a thumbnut. The thumbnut is molded around the thimble and a firm bond is established between these elements by providing the thimble on its outer surface with knurlings 20, the material of the cap flowing, in the molding operation, between the knurlings of the thimble. As appears from Fig. 2 of the drawings, the underface 21 of the thimble is disposed a substantial distance above the underface 22 of the cap, for a purpose hereinafter to be described.

The plastic material, of which the cap is formed, must possess sufficient strength and toughness to withstand the pressure to which the cap is subjected as the thimble is screwed down on its bolt. On the other hand, the cap material must possess a certain amount of elasticity, as will hereinafter appear. Also, the cap material must be acid-resistant, to withstand the action of the battery electrolyte.

Between the cap 19 and the lug 13 are interposed two washers 23 of plastic material, preferably, polyethylene. This material is not affected by the battery electrolyte and it provides washers which are of sufficient stiffness but still flexible or pliant enough to permit radial elongation of the washers. The perforation 24 in each washer is, initially, of a size fitting tightly the bolt 15.

After the hold-down frame 12 has been mounted on the battery, the bolts 15 having been passed through the lug apertures 14, the washers 23 are engaged with said bolts and forced toward their respective lugs 13. In these positions of the elements, the lower washer of each pair is in contact with its lug and the upper washer of each pair is in contact with its mate. The screw-threaded thimbles 18 are then engaged with their bolts and screwed home. When the undersurface of the cap 22 contacts its upper washer 23 and the turning of the cap is continued, pressure is exerted on the two washers of the set, causing the washers radially to expand, whereby the material adjacent the perforations thereof is forced into gripping engagement with the threads of the bolt 15 (Fig. 2), so that said washers are converted into nuts, the upper one of the set constituting a locknut for its mate, thereby preventing the lower washer from loosening under vibration. Due to the elasticity of the upper washer, the thimble nut 18 of the set is also prevented from loosening. The radial spreading of the washers is made possible by the fact that the cap 19 engages the upper washer of the set at a substantial distance from the threaded surface of the bolt 15. This is one of the reasons why the underface of the thimble is placed above the underface of said cap. Another reason is that the unyielding material of the thimble would, if contacted with the washers, prevent radial spreading of the same and, thus, preclude conversion of the same into nuts, as above described. The conversion of the washers into nuts is aided by the elasticity of the cap material.

What I claim is:

1. The combination with a storage battery and its support, of a hold-down frame applied to said battery, bolts secured to said support and extending through and above said frame, the upper portions of said bolts being screw-threaded, two non-metallic washers of acid-resistant sufficiently stiff but pliant enough material associated with each bolt to permit radial expansion of said washers under pressure, the lower washer of each set resting on said frame, a metallic nut on each bolt, and a cap of acid-resistant plastic material wholly enclosing said nut and bearing against the upper washer of its set at an area located at a substantial distance from the screw-threaded surface of said bolt, said nut being fixed to its cap and its underface being disposed at a substantial distance above that face of said cap which bears against the upper washer of its set, the diameters of the perforations in said washers being initially of a size fitting tightly the screw-threaded portions of said bolts, whereby said washers are converted into nuts when pressure is applied to the same by said caps in screwing down said metallic nuts on said bolts.

2. In a combination according to claim 1, said washers being formed of polyethylene.

References Cited in the file of this patent
UNITED STATES PATENTS

| | | |
|---|---|---|
| 2,653,835 | Nelson | Sept. 29, 1953 |
| 2,710,660 | Coleman | June 14, 1955 |
| 2,756,795 | Clingman | July 31, 1956 |

FOREIGN PATENTS

| | | |
|---|---|---|
| 297,521 | Great Britain | Sept. 27, 1928 |